UNITED STATES PATENT OFFICE.

JOHN W. SCOTT, OF ENGLEWOOD, NEW JERSEY, ASSIGNOR TO ARBUCKLE BROTHERS, A FIRM COMPRISING WILLIAM A. JAMISON, CATHERINE A. JAMISON, AND CHRISTIANA ARBUCKLE, OF NEW YORK, N. Y.

PROCESS OF RECONDITIONING BONE-BLACK.

1,177,725.     Specification of Letters Patent.     Patented Apr. 4, 1916.

No Drawing.     Application filed December 28, 1914. Serial No. 879,274.

*To all whom it may concern:*

Be it known that I, JOHN W. SCOTT, a citizen of the United States of America, residing in Englewood, in the county of Bergen and State of New Jersey, have invented a certain new and useful Process of Reconditioning Bone-Black, of which the following is a specification.

Bone-black, or animal charcoal, (commonly called char) is used in sugar refining and other industries for the purifying and decolorization of syrups or solutions. After a certain period of such use the char becomes so impregnated with various impurities that it loses its decolorizing power. It is customary then to recondition or revivify the char by first washing or percolating with hot water, and then drying and recalcining in suitable retorts without access of air. This reconditioning may be performed repeatedly, but in course of time the impurities which are thereby carbonized so fill or clog the pores of the char that it becomes valueless for further use.

The present invention provides an improved process for reconditioning bone-black or char whereby it is more effectually purified or restored.

According to the present invention the dried char has added to it a small proportion of calcium oxid or quicklime in powdered form, after which it is subjected to the usual calcining operation and then washed as usual. The result of this treatment is that the char is restored to a normal condition, its pores being cleared of accumulated salts, and the recalcined char is rendered equal to new char for the removal of color and the absorption of impurities from liquids.

The preferred mode of practising the invention is as follows:—The char to be reconditioned is prepared for calcining in any known or suitable way. Preferably it is thoroughly washed and then dried. There is then added to it a proportion of powdered quicklime which will vary according to the condition of the char. Ordinarily about one per cent. or less of lime is sufficient at each calcining. The powdered lime is mixed with the char and the latter is then calcined in any suitable kiln, either rotary or other, and under any ordinary conditions such as are well known to workers in this art. The recalcined char after leaving the kiln is cooled in any usual manner. It will usually be found desirable to repeat the calcining operation, a further quantity of lime being added before each recalcining. For example the calcining may be performed three successive times, lime being added each time. The total addition of lime will usually vary between one and three per cent. of the weight of the char, although in some cases it may amount to as much as from six to possibly ten per cent. The condition of the char will determine the amount of lime required and the number of times it must be recalcined before the desired restoration is attained. After the last calcining the char should be washed before it is again used for the decolorizing or purifying of liquids. This washing removes the greater part of the salts which have been rendered soluble by the treatment, especially the calcium sulfid.

Generally for sugar refining it will be suitable to calcine the char with say one per cent. of lime to partially recondition it, after which it is washed and then used through the usual cycle of operations with sugar liquor, whereupon it may be washed again and reconditioned and again used with liquor, and this method be repeated until the desired results are obtained for the reconditioning of the char.

In the use of char for decolorizing or purifying liquids, it is found that it becomes contaminated with various impurities including iron, calcium sulfate and calcium sulfid, as well as carbonaceous matter, and various impurities which on analysis are reduced to ash. In the ordinary revivifying by calcining the organic matters are mainly converted into carbon which gradually accumulates and eventually chokes the pores of the char. Certain salts, particularly the calcium salts, also accumulate, and these the ordinary revivifying process only imperfectly eliminates. In sugar refining the char takes up organic matter (which is carbonized in recalcining), sulfates, sulfids, iron and other impurities. My improved process is more effective in eliminating these various impurities from the char than the processes heretofore practised.

As an example of the results following the use of my process I give below an analysis of an exhausted char after first being calcined in the ordinary manner, and then after being used as usual, treated by my process, viz:—

|  | After ordinary calcination. | After treatment by my process. |
|---|---|---|
| Carbon | 9.76% | 7.94% |
| Ash (silicates) | 1.04 | .89 |
| Iron | .23 | .14 |
| $CaSO_4$ | .88 | .45 |
| CaS | .60 | .15 |
| $CaCO_3$ | 2.83 | 4.04 |
| Residue (mainly calcium phosphates) | 84.66 | 86.39 |
|  | 100.00 | 100.00 |

From this analysis it will be seen that my process is highly effective in the elimination of ash, iron, and lime salts.

An important advantage of this process is that it greatly diminishes the amount of water needed for washing out the absorbed impurities from the char preparatory to reconditioning. By the method heretofore practised, a very large quantity of water is required for this purpose. By the new process only about one-third as much water is required.

The process is susceptible of considerable variation in the details of manipulation, as will be apparent to those skilled in the handling or revivifying of bone-black. Within approximately the limits named the proportion of lime to be used will be determined by the judgment of the operator, guided by an analysis of the char to be purified or by his general knowledge of its condition. An important precaution is that the char to be calcined shall have been well dried in order that there shall be no objectionable slackening of the powdered quicklime. The latter should also be thoroughly commingled with the char.

It is not absolutely essential that the lime be used in the form of quicklime, although this is highly preferable. The use of any suitable compound from which quicklime would result during the calcining, would be admissible. The use of chlorinated lime (bleaching powder) is contemplated in cases where the chlorin would be beneficial.

I claim as my invention:—

1. The reconditioning of bone-black by adding lime thereto and then calcining.

2. The reconditioning of bone-black by adding thereto a small proportion of lime and then calcining, and then repeating the process.

3. The reconditioning of bone-black by adding thereto while dry a small proportion of powdered quicklime and then calcining.

4. The reconditioning of bone-black by repeatedly adding lime and calcining and finally washing.

In witness whereof, I have hereunto signed my name in the presence of two subscribing witnesses.

JOHN W. SCOTT.

Witnesses:
LOUIS J. QUAD,
LEWIS WACHENBERG.